(12) United States Patent
Hirose et al.

(10) Patent No.: US 7,375,906 B2
(45) Date of Patent: May 20, 2008

(54) WIDE-ANGLE LENS SYSTEM AND IMAGE-TAKING DEVICE

(75) Inventors: Masatoshi Hirose, Toyohashi (JP); Masashi Isono, Hoi-gun (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/398,947

(22) Filed: Apr. 6, 2006

(65) Prior Publication Data

US 2006/0227434 A1 Oct. 12, 2006

(30) Foreign Application Priority Data

Apr. 11, 2005 (JP) ............. 2005-113196

(51) Int. Cl.
*G02B 13/04* (2006.01)
(52) U.S. Cl. .................... 359/749; 359/781
(58) Field of Classification Search ........... 359/749, 359/750, 751, 752, 753, 754, 755, 756, 680, 359/681, 682, 683
See application file for complete search history.

(56) References Cited

U.S. PATENT DOCUMENTS

| | | | | |
|---|---|---|---|---|
| 5,159,493 A * | 10/1992 | Tsutsumi | ............ | 359/680 |
| 5,317,451 A * | 5/1994 | Hasushita | ............ | 359/643 |
| 5,680,259 A | 10/1997 | Yamada | ............ | 359/753 |
| 5,862,000 A | 1/1999 | Takahashi et al. | ............ | 359/773 |
| 5,969,873 A * | 10/1999 | Sugawara | ............ | 359/645 |
| 6,259,508 B1 * | 7/2001 | Shigematsu | ............ | 355/53 |
| 6,452,729 B2 * | 9/2002 | Yamamoto | ............ | 359/676 |
| 6,560,041 B2 * | 5/2003 | Ikeda et al. | ............ | 359/749 |
| 6,603,610 B2 * | 8/2003 | Murata et al. | ............ | 359/751 |
| 6,757,109 B2 * | 6/2004 | Bos | ............ | 359/753 |
| 2003/0161050 A1 | 8/2003 | Sato et al. | ............ | 359/771 |
| 2004/0021958 A1 * | 2/2004 | Mizuguchi | ............ | 359/793 |

FOREIGN PATENT DOCUMENTS

| | | |
|---|---|---|
| JP | 04-298709 A | 10/1992 |
| JP | 2003-195163 A | 7/2003 |
| JP | 2004-102162 A | 4/2004 |

OTHER PUBLICATIONS

European Search Report dated Jul. 6, 2006, for counterpart European Application No. Ep 06 00 7532.

* cited by examiner

*Primary Examiner*—Timothy Thompson
(74) *Attorney, Agent, or Firm*—Sidley Austin LLP

(57) ABSTRACT

A wide-angle lens system has, from the object side thereof: a first lens element having a negative optical power and having a meniscus shape convex to the object side; a second lens element having a biconcave shape; a third lens element having a biconvex shape; and a fourth lens element having a negative optical power and having a meniscus shape convex to the image side. Alternatively, a wide-angle lens system has, from the object side thereof: a first lens element having a negative optical power; a second lens element having a negative optical power; a third lens element having a positive optical power; and a fourth lens element having a positive optical power.

9 Claims, 3 Drawing Sheets

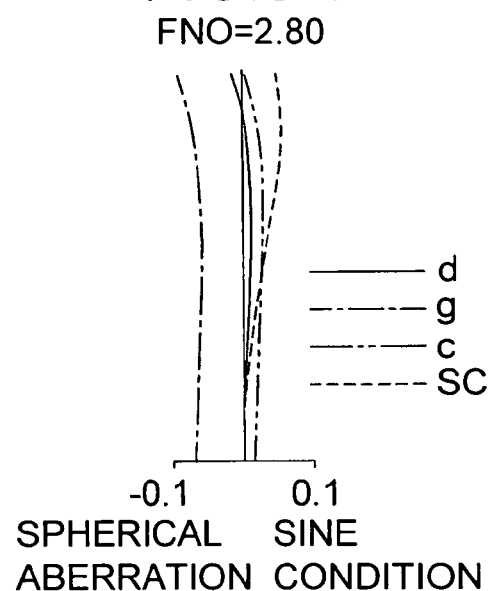
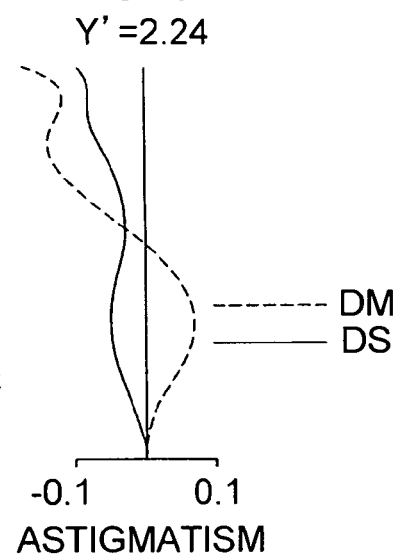
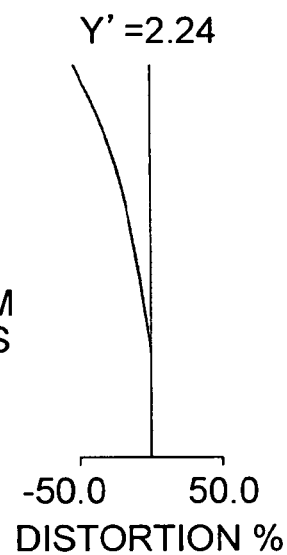
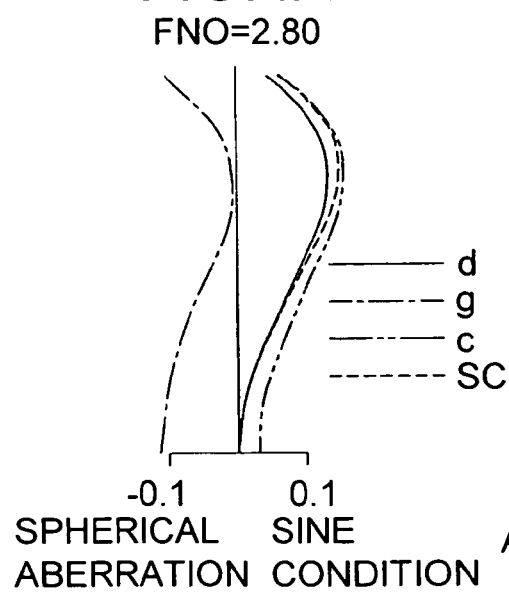
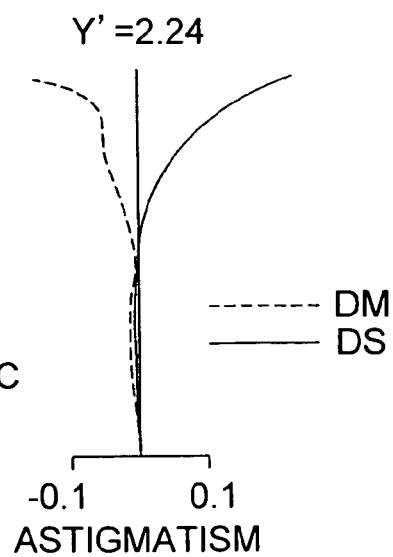
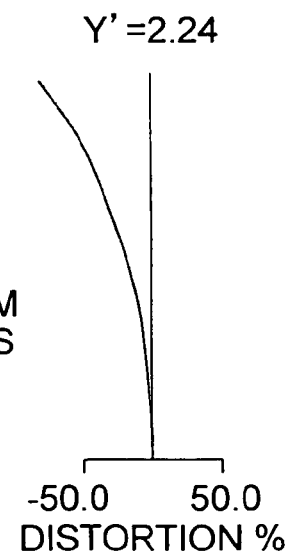

WIDE-ANGLE LENS SYSTEM AND IMAGE-TAKING DEVICE

This application is based on Japanese Patent Application No. 2005-113196 filed on Apr. 11, 2005, the contents of which are hereby incorporated by reference.

BACKGROUND OF THE INVENTION

1. Field of the Invention

The present invention relates to a compact wide-angle lens system, and more particularly to a wide-angle lens system that offers a total angle of view of about 150 degrees and that is suitable for use with a solid-state image sensor in a digital input device (such as a digital still camera or a digital video camera) like a videophone, an intercom, a surveillance camera, a vehicle-mounted camera, or the like.

2. Description of Related Art

There have conventionally been proposed many wide-angle lens systems designed as an image-taking optical system for use with a solid-state image sensor in a surveillance camera, a vehicle-mounted camera, or the like. Among such wide-angle lens systems are those that offer a total angle of view of about 150 degrees, of which some are composed of, for example, eight lens elements (see Patent Publication 1 listed below).

Patent Publication 1: JP-A-2004-102162

The wide-angle lens system disclosed in Patent Publication 1 mentioned above, however, requires an extremely large number of lens elements, namely eight, and has a complicated construction with an extremely large total length. Moreover, all the lens elements are glass lens elements, making the wide-angle lens system unsatisfactory in terms of cost and weight.

SUMMARY OF THE INVENTION

In view of the conventionally experienced inconveniences mentioned above, it is an object of the present invention to provide a low-cost, light-weight, compact wide-angle lens system that includes four lens elements and that, suitably as an image-taking optical system for use with a solid-state image sensor, offers satisfactory optical performance and a wide total angle of view.

To achieve the above object, according to one aspect of the present invention, a wide-angle lens system is provided with, from the object side thereof: a first lens element having a negative optical power and having a meniscus shape convex to the object side; a second lens element having a biconcave shape; a third lens element having a biconvex shape; and a fourth lens element having a negative optical power and having a meniscus shape convex to the image side.

According to another aspect of the present invention, a wide-angle lens system comprising, from the object side thereof: a first lens element having a negative optical power; a second lens element having a negative optical power; a third lens element having a positive optical power; and a fourth lens element having a positive optical power.

According to still another aspect of the present invention, an image-taking device is provided with one of the wide-angle lens systems described above, and forms an image on a solid-state image sensor by using the wide-angle lens system.

Thus, according to the present invention, it is possible to provide a low-cost, light-weight, compact wide-angle lens system that includes four lens elements and that, suitably as an image-taking optical system for use with a solid-state image sensor, offers satisfactory optical performance and a wide total angle of view.

By using a wide-angle lens system according to the present invention as an image-taking optical system for use in, in particular, a digital input device (such as a digital still camera or a digital video camera) for a videophone, an intercom, a surveillance camera, a vehicle-mounted camera, or the like, it is possible to make the digital input device wide-angle, versatile, low-cost, light-weight, and compact.

BRIEF DESCRIPTION OF THE DRAWINGS

FIGS. 3A to 3C are diagrams showing the aberrations observed in Numerical Example 1;

FIGS. 4A to 4C are diagrams showing the aberrations observed in Numerical Example 2.

DETAILED DESCRIPTION OF PREFERRED EMBODIMENTS

Hereinafter, wide-angle lens systems embodying the present invention will be described with reference to the accompanying drawings.

Figure 1:
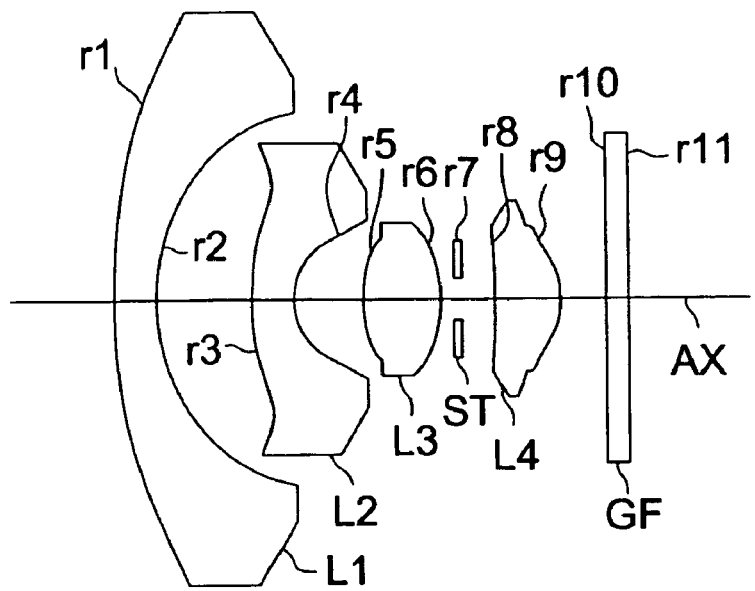
FIG. 1 is a diagram showing the lens construction of a first embodiment, and hence Numerical Example 1, of the present invention.
Figure 2:
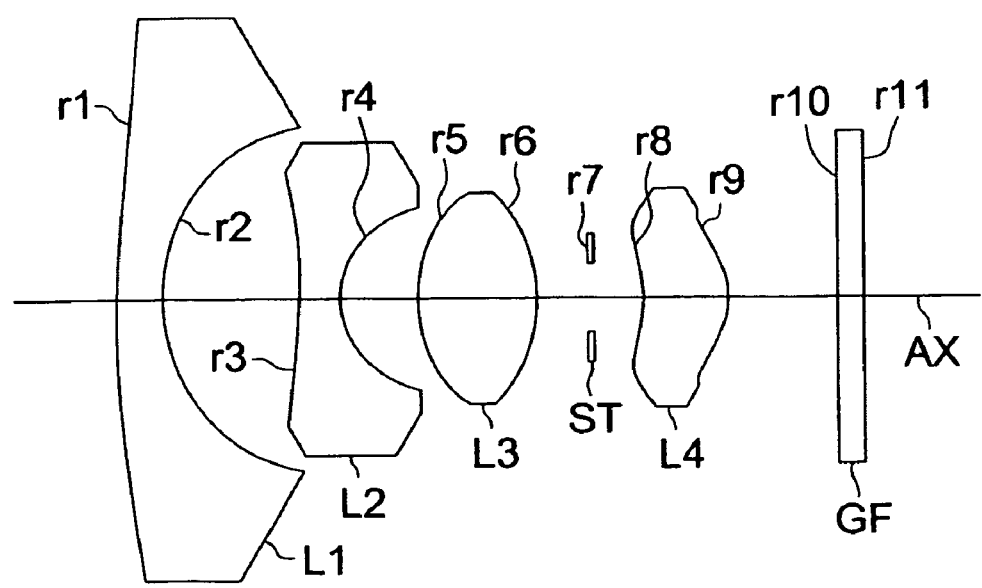
FIG. 2 is a diagram showing the lens construction of a second embodiment, and hence Numerical Example 2, of the present invention.

FIGS. 1 and 2 are optical sectional views showing the lens constructions of the wide-angle lens systems of a first and a second embodiment, respectively, of the present invention.

The wide-angle lens systems of the first and second embodiments are both designed as a single-focal-length wide-angle lens system for image taking (for example, for use in a digital camera), that is, for forming an optical image on a solid-state image sensor (for example, a CCD (charge-coupled device)), and has, disposed on an image-surface side thereof, a glass filter GF in the shape of a plane-parallel plate that corresponds to an optical low-pass filter or the like.

Moreover, the wide-angle lens systems both include four lens elements whose optical powers (an optical power is a quantity defined as the reciprocal of a focal length) are arranged, from the object side, as follows: a first lens element L1 having a negative optical power; a second lens element L2 having a negative optical power; a third lens element L3 having a positive optical power; an aperture stop ST; a fourth lens element L4 having a positive optical power; and a glass filter GF.

The first lens element L1 is a glass lens element having spherical surfaces on both sides thereof. The second, third, and fourth lens elements L2, L3, and L4 are each a plastic lens element having an aspherical surface on at least one side thereof.

The wide-angle lens systems of the first and second embodiments are both composed of, from the object side; a negative meniscus lens element L1 convex to the object side; a biconcave lens element L2; a biconvex lens element L3; a positive meniscus lens element L4 convex to the image-surface side; and a glass filter GF.

Constructed as described above, the wide-angle lens systems of both embodiments offer a wide angle of view, have distortion properly corrected for, and can form an optical image suitably for a solid-state image sensor. Why this is so will be described in detail below.

As described above, the first and second lens elements L1 and L2 are negative lens elements both having a concave surface on the image-surface side, and, through these lens elements L1 and L2, off-axial rays incident at sharp angles can be effectively directed to the fourth lens element L4, which is a positive lens element disposed farther behind. Thus, the two negative lens elements L1 and L2 can jointly and hence effectively correct various aberrations. The aberrations that the two negative lens elements L1 and L2 leave uncorrected for can be corrected for with the third lens element L3, which is a positive lens element. This helps achieve higher performance.

The fourth lens element L4, which is the most image-side, positive lens element, serves to place the exit pupil far away. This helps reduce the angle of incidence of the principal ray of the rays that are imaged in a peripheral part of the image-sensing surface of the solid-state image sensor (that is, the angle of the principal ray relative to the optical axis), and thus helps achieve higher performance by correcting for various aberrations while achieving telecentricity. As a result of telecentricity being achieved, it is possible to alleviate the phenomenon (called shading) of effective aperture efficiency lowering in a peripheral part of the image-sensing surface.

Disposing the aperture stop ST between the third and fourth lens elements helps reduce the aperture stop ST small, and helps place the exit pupil far away.

If the aperture stop ST is disposed farther to the object side than described above, the exit pupil is placed farther away. This is an advantage in a lens system for use with a solid-state image sensor, but makes the aperture stop ST unduly large. Furthermore, as a result of the aperture stop ST being unduly large, extremely large distortion is produced. On the other hand, if the aperture stop ST is disposed farther to the image side than described above, the exit pupil is placed in a position disadvantageous in a lens system for use with a solid-state image sensor.

Thus, a wide-angle lens system composed of, from the object side, a negative lens element L1, a negative lens element L2, a positive lens element L3, an aperture stop ST, and a positive lens element L4, despite being composed of four lens elements, makes it possible to realize a low-cost, light-weight, compact wide-angle lens system that, suitably as an image-taking optical system for use with a solid-state image sensor, offers satisfactory optical performance and an angle of view of about 150 degrees.

Next, the conditional formulae that should preferably be fulfilled by the wide-angle lens systems of the embodiments, that is, the conditional formulae that should preferably be fulfilled by a wide-angle lens system of the type like those of the embodiments, will be described. It should however be understood that not all the conditional formulae described below need to be fulfilled simultaneously. That is, individually fulfilling whichever of those conditional formulae is appropriate for a given optical construction provides the corresponding benefits and advantages. Needless to say, from the viewpoints of optical performance, compactness, assembly, and other aspects, it is preferable that as many of the conditional formulae as possible be fulfilled.

It is preferable that the second lens element fulfill conditional formula (1) below.

$$0.2<(r3+r4)/(r3-r4)<0.9 \quad (1)$$

where r3 represents the object-side paraxial radius of curvature of the second lens element; and r4 represents the image-surface-side paraxial radius of curvature of the second lens element.

Conditional formula (1) above defines the shape of the second lens element, and is concerned chiefly with a proper balance between the position of the exit pupil and the distortion produced. Disregarding the lower limit of conditional formula (1) helps place the exit pupil far from the image side, and is therefore advantageous in a lens system for use with a solid-state image sensor, but disadvantageously results in increased negative distortion and extremely large barrel-shaped distortion.

By contrast, disregarding the upper limit of conditional formula (1) helps reduce distortion, but places the exit pupil so near to the image side as to be disadvantageous in a lens system for use with a solid-state image sensor.

Out of these considerations, it is further preferable that conditional formula (1A) below be fulfilled.

$$0.3<(r3+r4)/(r3-r4)<0.8 \quad (1A)$$

It is preferable that the total angle of view of the wide-angle lens system fulfill conditional formula (2) below.

$$2W>140 \text{ degrees} \quad (2)$$

where 2W represents the total angle of view of the wide-angle lens system.

Conditional formula (2) above is concerned with the total angle of view. Disregarding the range defined by conditional formula (2) makes the range of image taking too narrow to suit a wide-angle lens system. It is further preferable that conditional formula (2A) below be fulfilled.

$$2W>150 \text{ degrees} \quad (2A)$$

It is preferable that the first lens element fulfill conditional formula (3) below.

$$0.01<f/r1<0.12 \quad (3)$$

where f represents the focal length of the entire wide-angle lens system; and r1 represents the object-side radius of curvature of the first lens element.

Conditional formula (3) above defines the object-side shape of the first lens element, and is concerned chiefly with a proper balance between the position of the exit pupil and the distortion produced. Disregarding the lower limit of conditional formula (3) helps place the exit pupil far from the image side, and is therefore advantageous in a lens system for use with a solid-state image sensor, but disadvantageously results in increased negative distortion and extremely large barrel-shaped distortion.

By contrast, disregarding the upper limit of conditional formula (3) helps reduce distortion, but places the exit pupil so near to the image side as to be disadvantageous in a lens system for use with a solid-state image sensor.

Out of these considerations, it is further preferable that conditional formula (3A) below be fulfilled.

$$0.02<f/r1<0.1 \quad (3A)$$

It is preferable that the second lens element fulfill conditional formula (4) below.

$$-0.8<f/f2<-0.2 \quad (4)$$

where f represents the focal length of the entire wide-angle lens system; and f2 represents the focal length of the second lens element.

Conditional formula (4) above defines the optical power of the second lens element, and is concerned chiefly with a proper balance between the position of the exit pupil and the distortion produced. Disregarding the lower limit of conditional formula (4) helps place the exit pupil far from the image side, and is therefore advantageous in a lens system for use with a solid-state image sensor, but disadvantageously results in increased negative distortion and extremely large barrel-shaped distortion.

By contrast, disregarding the upper limit of conditional formula (4) helps reduce distortion, but places the exit pupil so near to the image side as to be disadvantageous in a lens system for use with a solid-state image sensor.

Out of these considerations, it is further preferable that conditional formula (4A) below be fulfilled.

$$-0.7 < f/f2 < -0.3 \qquad (4A)$$

Using a glass lens element as the most object-side lens element helps minimize deterioration of optical performance in the face of environmental variations such as temperature variations. Using a glass spherical lens element helps reduce the cost of the optical system, as compared with using a glass aspherical lens element.

Using a plastic lens element having an aspherical surface on at least one side thereof as each of the second, third, and fourth lens elements helps greatly reduce the number of lens elements, as compared with using glass spherical surfaces. Moreover, it is possible to realize an inexpensive optical system with a reduced total length and light weight.

The wide-angle lens systems of the embodiments are composed solely of refractive lens elements, which deflect incident light by refraction (i.e. lens elements of the type that deflects light at the interface between two media having different refractive indices).

It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Inconveniently, however, these lens elements are expected to require increased cost because of the complicated fabrication process they require. Therefore, in a wide-angle lens system embodying the invention, it is preferable to use lens elements formed of a uniform material.

In the embodiments, a surface having no optical power (for example, a reflective, refractive, or diffractive surface) may be disposed in the optical path to bend the optical path in front of, behind, or in the middle of the wide-angle lens. Where to bend the optical path may be determined to suit particular needs. By bending the optical path appropriately, it is possible to make apparently slim and compact the digital input device (such as a digital camera) in which the wide-angle lens system is incorporated.

The glass filter GF disposed between the last surface of the wide-angle lens system and the solid-state image sensor is assumed to be a plane-parallel plate corresponding to an optical low-pass filter LP, an IR cut filter IRC, and/or the shield glass of a solid-state image sensor SR, but may instead be anything else that suits the digital input device actually used.

For example, it is possible to use a birefringence-type low-pass filter made of quartz or the like having an appropriately aligned crystal axis, a phase-type low-pass filter that achieves the required optical cut-off frequency characteristics by exploiting diffraction, or the like.

The wide-angle lens systems of the embodiments offer satisfactory optical performance, are low-cost, light-weight, and compact, offer a wide angle of view, and are thus suitable for use in a compact image-taking device that is used as a main component of a digital input device.

Figure 5:
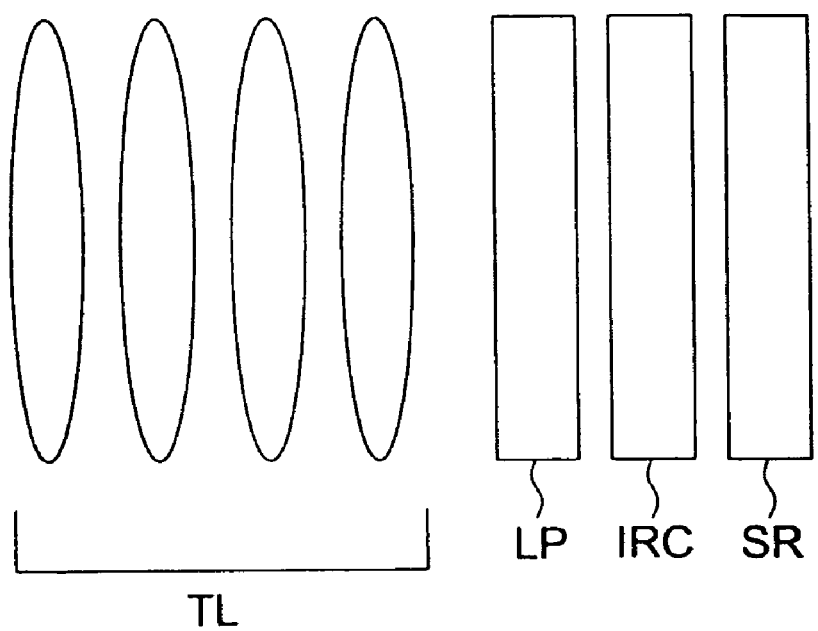
FIG. 5 is a diagram showing an outline of the construction of an image-taking device according to the present invention.

For example as shown in FIG. 5, such an image-taking device is composed of, from the object side: a taking lens system TL embodying the present invention that forms an optical image of an object; an optical low-pass filer LP and an IR cut filter IRC; and a solid-state image sensor SR that converts the optical image formed by the taking lens system TL into an electrical signal.

Used as the solid-state image sensor is, for example, a CCD or CMOS (complementary metal-oxide-semiconductor) image sensor having a plurality of pixels.

The optical image to be formed by the wide-angle lens system passes through the optical low-pass filter having a predetermined cutoff frequency characteristic that depends on the pixel pitch of the solid-state image sensor, and meanwhile the optical image has its spatial frequency characteristic so adjusted as to minimize so-called aliasing noise generated when the optical image is converted into an electric signal.

Thus, by incorporating an image-taking device as described above in a camera used to take a still picture or a moving picture of a subject (for example, a digital camera, a video camera, a surveillance camera, a vehicle-mounted camera, a camera incorporated or externally fitted to one of the following devices (a digital video unit, a personal computer, a mobile computer, a cellular phone, a videophone, an intercom, a portable data terminal (or a PDA, i.e., personal digital assistant), or a peripheral device therefor (such as a mouse, a scanner, a printer, or other digital input/output device)), or the like), it is possible to make the camera or device high-performance, versatile, low-cost, and compact.

EXAMPLES

Now, numerical examples corresponding to the first and second embodiments described above will be presented in detail, with reference to their construction data, aberration diagrams, and other data.

The lens constructions of Numerical Examples 1 and 2 presented below correspond to those of the first and second embodiments shown FIGS. 1 and 2, respectively.

Tables 1 and 2 show the construction data and other data of Numerical Examples 1 and 2, respectively. In each numerical example, ri (i=1, 2, 3, . . . ) represents the radius of curvature of the i-th surface as counted from the object side, di (i=1, 2, 3, . . . ) represents the i-th axial distance as counted from the object side, and Ni (i=1, 2, 3, . . . ) and vi (i=1, 2, 3, . . . ) represent the refractive index for the d-line and the Abbe number, respectively, of the i-th lens element as counted from the object side. Moreover, f represents the focal length of the entire wide-angle lens system, ω represents the half angle of view, and FNO represents the f-number.

In the construction data, a letter "D" following a value indicates the exponential part of the value. For example "1.0D-02" stands for "$1.0 \times 10^{-2}$".

In each numerical example, a surface of which the radius of curvature ri is marked with an asterisk (*) is a refractive optical surface having an aspherical shape or a surface that exerts a refractive effect equivalent to that of an aspherical surface. The surface shape of such an aspherical surface is defined by formula (AS) below.

$$X(H) = C \cdot H^2 / [1 + (1 - \epsilon \cdot C^2 \cdot H^2)^{1/2}] + \Sigma Ai \cdot Hi \quad \text{(AS)}$$

where
- H represents the height in the direction perpendicular to the optical axis;
- X(H) represents the displacement along the optical axis at the height H (relative to the vertex);
- C represents the paraxial curvature;
- $\epsilon$ represents the quadric surface parameter
- Ai represents the aspherical surface coefficient of order i; and
- Hi represents H raised to the power of i.

FIGS. 3A to 3C and FIGS. 4A to 4C are aberration diagrams of Numerical Examples 1 and 2. Of these aberration diagrams, FIGS. 3A and 4A show spherical aberration, FIGS. 3B and 4B show astigmatism, and FIGS. 3C and 4C show distortion.

In each spherical aberration diagram, a solid line d, a dash-and-dot line g, and a dash-dot-dot line represent the spherical aberration (mm) observed for the d-, g-, and c-lines, respectively, and a broken line SC represents the deviation (mm) from the sine condition.

In each astigmatism diagram, a solid line DS and a broken line DM represent the astigmatism (mm) observed for the d-line on the sagittal and meridional planes, respectively.

In each distortion diagram, a solid line represents the distortion (%) observed for the d-line.

In the spherical aberration diagrams, the vertical axis represents the f-number FNO of rays. In the astigmatism and distortion diagrams, the vertical axis represents the maximum image height Y' (mm).

Table 3 shows the values of conditional formulae (1), (2), (3), and (4) as actually observed in each numerical example.

TABLE 1

Numerical Example 1 f 1.24(mm)    ω 76°    FN0 2.8

| | Radius of Curvature: rd | | Axial Distance: dd | Refractive Index: Nd | | Abbe Number: vd |
|---|---|---|---|---|---|---|
| r1  | 14.807  | d1  | 0.900 | N1 | 1.69100 v1 | 54.75 |
| r2  | 4.304   | d2  | 2.222 | N2 | 1.52510 v2 | 56.38 |
| r3* | −9.456  | d3  | 0.800 | N3 | 1.52510 v3 | 56.38 |
| r4* | 1.724   | d4  | 1.562 | N4 | 1.52510 v4 | 56.38 |
| r5* | 2.449   | d5  | 1.751 | N5 | 1.51680 v5 | 64.20 |
| r6* | −2.597  | d6  | 0.363 | | | |
| r7  | ∞       | d7  | 0.838 | | | |
| r8* | −26.866 | d8  | 1.464 | | | |
| r9* | −1.732  | d9  | 1.006 | | | |
| r10 | ∞       | d10 | 0.500 | | | |
| r11 | ∞       | | | | | |

Coefficients of Aspherical Surfaces
(As Counted from Object Side)

Surface 3

| | | |
|---|---|---|
| C  | −1/9.465   |        |
| ε  | 0.10000    | D + 01 |
| A4 | 0.57938    | D − 01 |
| A6 | −0.99019   | D − 02 |
| A8 | 0.58719    | D − 03 |

TABLE 1-continued

Numerical Example 1

| | | |
|---|---|---|
| A10 | −0.11056 | D − 04 |

Surface 4

| | | |
|---|---|---|
| C  | 1/1.724  |        |
| ε  | 0.10000  | D + 01 |
| A4 | −0.14227 | D − 01 |
| A6 | 0.23099  | D + 00 |
| A8 | −0.12351 | D + 00 |
| A10| 0.16418  | D − 01 |

Surface 5

| | | |
|---|---|---|
| C  | 1/2.449  |        |
| ε  | 0.10000  | D + 01 |
| A4 | 0.31086  | D − 01 |
| A6 | −0.24211 | D − 01 |
| A8 | 0.11594  | D − 01 |
| A10| −0.43934 | D − 02 |

Surface 6

| | | |
|---|---|---|
| C  | −1/2.597 |        |
| ε  | 0.10000  | D + 01 |
| A4 | 0.38618  | D − 01 |
| A6 | −0.23921 | D − 01 |
| A8 | 0.55097  | D − 02 |
| A10| −0.95690 | D − 03 |

Surface 8

| | | |
|---|---|---|
| C  | −1/26.866 |        |
| ε  | 0.10000   | D + 01 |
| A4 | −0.91943  | D − 01 |
| A6 | 0.10761   | D + 00 |
| A8 | −0.48104  | D − 01 |
| A10| 0.72114   | D − 02 |

Surface 9

| | | |
|---|---|---|
| C  | −1/1.732 |        |
| ε  | 0.10000  | D + 01 |
| A4 | 0.66534  | D − 01 |
| A6 | −0.62869 | D − 01 |
| A8 | 0.42192  | D − 01 |
| A10| −0.68441 | D − 02 |

TABLE 2

Numerical Example 2 f 1.43(mm)    ω 82°    FN0 2.8

| | Radius of Curvature: rd | | Axial Distance: dd | Refractive Index: Nd | | Abbe Number: vd |
|---|---|---|---|---|---|---|
| r1  | 44.217 | d1  | 0.900 | N1 | 1.62280 v1 | 56.88 |
| r2  | 3.648  | d2  | 2.435 | N2 | 1.52510 v2 | 56.38 |
| r3* | −5.075 | d3  | 0.800 | N3 | 1.52510 v3 | 56.38 |
| r4* | 1.860  | d4  | 1.455 | N4 | 1.52510 v4 | 56.38 |
| r5* | 2.740  | d5  | 2.169 | N5 | 1.51680 v5 | 64.20 |
| r6* | −2.587 | d6  | 1.028 | | | |
| r7  | ∞      | d7  | 0.954 | | | |
| r8* | −3.687 | d8  | 1.629 | | | |
| r9* | −1.732 | d9  | 2.000 | | | |
| r10 | ∞      | d10 | 0.500 | | | |
| r11 | ∞      | | | | | |

Coefficients of Aspherical Surfaces
(As Counted from Object Side)

Surface 3

| | | |
|---|---|---|
| C  | −1/5.075 |        |
| ε  | 0.10000  | D + 01 |
| A4 | 0.30685  | D − 01 |
| A6 | −0.53044 | D − 02 |
| A8 | 0.58468  | D − 03 |
| A10| −0.36838 | D − 04 |

TABLE 2-continued

Numerical Example 2

| | Surface 4 | |
|---|---|---|
| C | | 1/1.860 |
| ε | 0.10000 | D + 01 |
| A4 | 0.94716 | D − 02 |
| A6 | 0.26191 | D − 01 |
| A8 | −0.10640 | D − 01 |
| A10 | 0.22112 | D − 03 |
| | Surface 5 | |
| C | | 1/2.740 |
| ε | 0.10000 | D + 01 |
| A4 | 0.15559 | D − 02 |
| A6 | 0.13415 | D − 02 |
| A8 | −0.18064 | D − 02 |
| A10 | 0.22870 | D − 03 |
| | Surface 6 | |
| C | | −1/2.587 |
| ε | 0.10000 | D + 01 |
| A4 | 0.22629 | D − 01 |
| A6 | −0.46735 | D − 02 |
| A8 | 0.93516 | D − 03 |
| A10 | −0.45915 | D − 04 |
| | Surface 8 | |
| C | | −1/3.687 |
| ε | 0.10000 | D + 01 |
| A4 | −0.83993 | D − 01 |
| A6 | 0.85566 | D − 01 |
| A8 | 0.21917 | D − 02 |
| A10 | −0.12123 | D − 01 |
| | Surface 9 | |
| C | | −1/1.732 |
| ε | 0.10000 | D + 01 |
| A4 | 0.24363 | D − 01 |
| A6 | −0.20713 | D − 01 |
| A8 | 0.20910 | D − 01 |
| A10 | −0.24901 | D − 02 |

TABLE 3

| | Conditional Formula | | | |
|---|---|---|---|---|
| | (1) | (2) | (3) | (4) |
| Numerical Example 1 | 0.69 | 152° | 0.08 | −0.46 |
| Numerical Example 2 | 0.46 | 164° | 0.03 | −0.57 |

What is claimed is:

1. A wide-angle lens system consisting essentially of, from an object side thereof:
a first lens element having a negative optical power and having a meniscus shape convex to the object side;
a second lens element having a biconcave shape;
a third lens element having a biconvex shape; and
a fourth lens element having a positive optical power and having a meniscus shape convex to an image side.

2. The wide-angle lens system of claim 1, wherein the second lens element fulfills the following conditional formula:

$$0.2<(r3+r4)/(r3-r4)<0.9$$

where
r3 represents an object-side paraxial radius of curvature of the second lens element; and
r4 represents an image-surface-side paraxial radius of curvature of the second lens element.

3. The wide-angle lens system of claim 1, wherein the following conditional formula is fulfilled $$2W>140 \text{ degrees}$$

where
2W represents a total angle of view of the wide-angle lens system.

4. The wide-angle lens system of claim 1, wherein the first lens element fulfills the following conditional formula:

$$0.01<f/r1<0.12$$

where
f represents a focal length of the entire wide-angle lens system; and
r1 represents an object-side radius of curvature of the first lens element.

5. The wide-angle lens system of claim 1, wherein the second lens element fulfills the following conditional formula:

$$-0.8<f/f2<-0.2$$

where
f represents a focal length of the entire wide-angle lens system; and
f2 represents a focal length of the second lens element.

6. The wide-angle lens system of claim 1, further comprising
an aperture stop disposed between the third and fourth lens elements.

7. The wide-angle lens system of claim 1, wherein the first lens element is a glass lens element, and the second to fourth lens elements each have an aspherical surface on at least one side thereof.

8. An image-taking device comprising:
the wide-angle lens system of claim 1,
wherein the image-taking device forms an image on a solid-state image sensor by using the wide-angle lens system.

9. The wide-angle lens system of claim 1, wherein the second lens element and third lens element are not either cemented or joined together.

* * * * *